Nov. 27, 1962

C. A. PARKER 3,065,904

READ-IN AND READ-OUT DEVICES FOR ACCOUNTING MACHINES

Filed April 22, 1958

INVENTOR.
CHARLES A. PARKER
BY
George V. Hall
ATTORNEY

INVENTOR.
CHARLES A. PARKER
BY
ATTORNEY

Nov. 27, 1962  C. A. PARKER  3,065,904
READ-IN AND READ-OUT DEVICES FOR ACCOUNTING MACHINES
Filed April 22, 1958  8 Sheets-Sheet 3
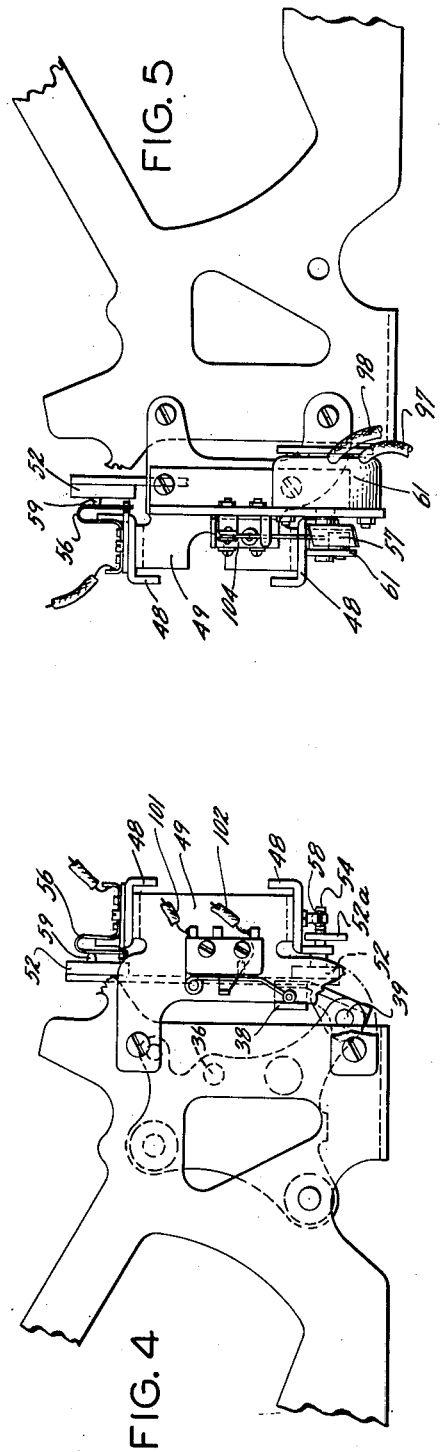
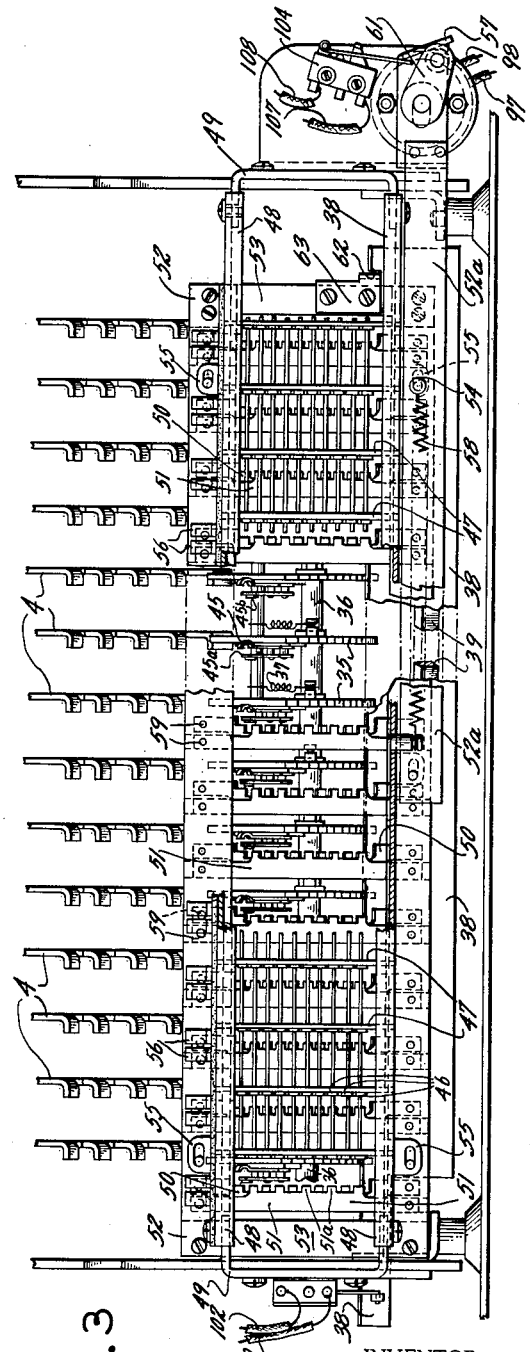
INVENTOR.
CHARLES A. PARKER
BY
ATTORNEY Nov. 27, 1962 C. A. PARKER 3,065,904
READ-IN AND READ-OUT DEVICES FOR ACCOUNTING MACHINES
Filed April 22, 1958 8 Sheets-Sheet 4

INVENTOR.
CHARLES A. PARKER
BY
ATTORNEY

Nov. 27, 1962   C. A. PARKER   3,065,904
READ-IN AND READ-OUT DEVICES FOR ACCOUNTING MACHINES
Filed April 22, 1958   8 Sheets-Sheet 5

INVENTOR.
CHARLES A. PARKER
BY
*George V. Hall*
ATTORNEY

Nov. 27, 1962             C. A. PARKER             3,065,904

READ-IN AND READ-OUT DEVICES FOR ACCOUNTING MACHINES

Filed April 22, 1958             8 Sheets-Sheet 6

INVENTOR.
CHARLES A. PARKER

BY

*George V. Hall*
ATTORNEY

Nov. 27, 1962

C. A. PARKER 3,065,904

READ-IN AND READ-OUT DEVICES FOR ACCOUNTING MACHINES

Filed April 22, 1958

INVENTOR.
CHARLES A. PARKER

BY

*George V. Hall*

ATTORNEY

Nov. 27, 1962 C. A. PARKER 3,065,904
READ-IN AND READ-OUT DEVICES FOR ACCOUNTING MACHINES
Filed April 22, 1958 8 Sheets-Sheet 8
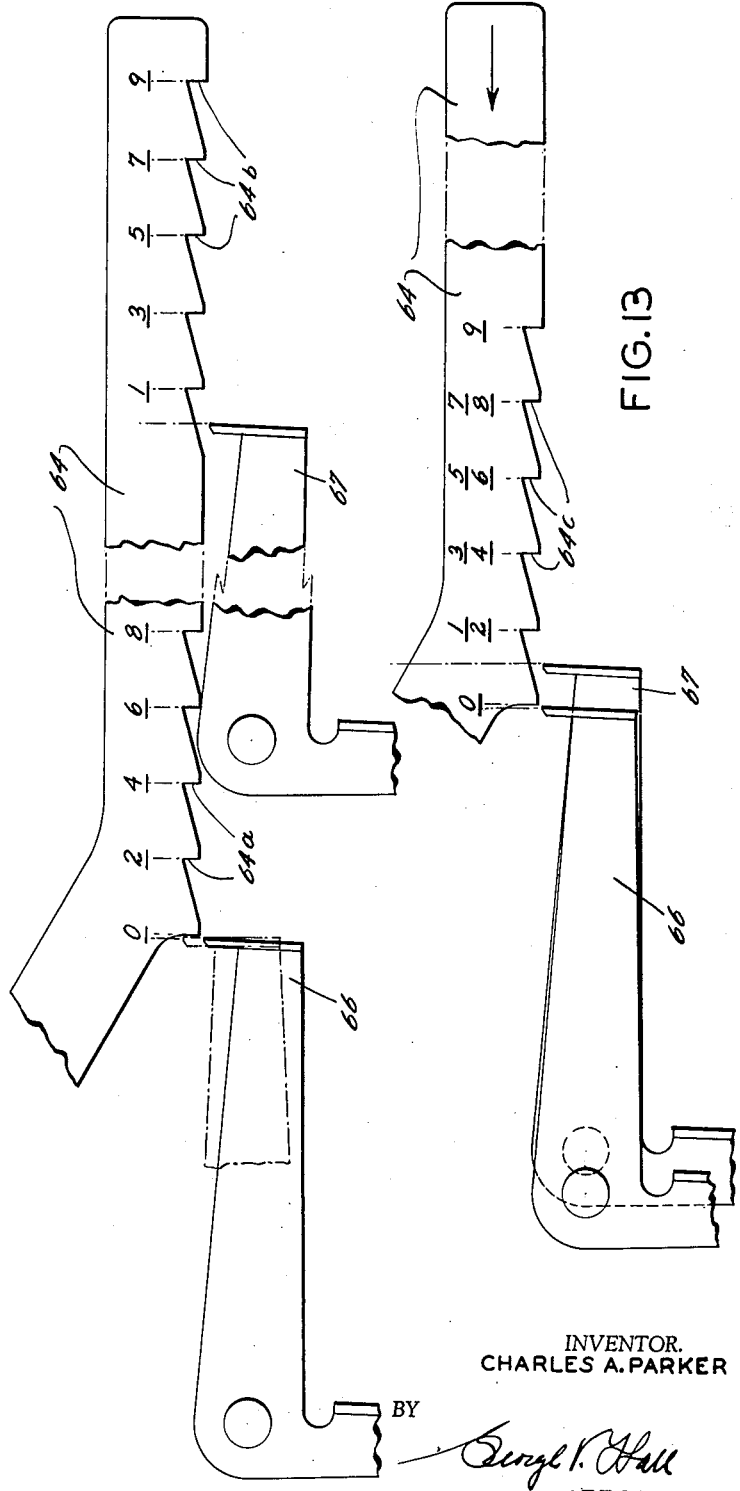
INVENTOR.
CHARLES A. PARKER
BY
ATTORNEY United States Patent Office 3,065,904
Patented Nov. 27, 1962

3,065,904
READ-IN AND READ-OUT DEVICES FOR
ACCOUNTING MACHINES
Charles A. Parker, East Orange, N.J., assignor to Monroe
Calculating Machine Company, Orange, N.J., a corporation of Delaware
Filed Apr. 22, 1958, Ser. No. 730,094
6 Claims. (Cl. 235—61)

This invention relates to read-out and read-in devices for accounting machines, and more particularly to means for reading into a receiving machine from read-out devices of a sending machine.

In certain accounting machine work, it is desirable to enter like values into a number of machines for the purpose of producing duplicate record sheets or for the purpose of performing subsequent operations on the respective machines.

It is accordingly the primary object of the invention to provide efficient and rapidly operable means for entering like values into a plurality of accounting machines.

A more specific object of the invention is to enter values corresponding to values entered into a sending machine automatically into one or more receiving machines.

A further object of the invention is to coordinate the operation of read-in devices to a receiving machine from read-out devices of a sending machine with operation of the machines so that the machines will be afforded their normal speed of operation.

In a preferred embodiment of the invention, the read-out devices for the sending machine operate at the end of the first half cycle of the machine to establish circuit connections in accordance with the digital values entered in or totaled from each order of the machine. When this operation is completed, operation of the receiving machine is initiated. As the actuator racks of the receiving machine move in their initial excursions, switching means of the read-out devices is operated in time with the racks to complete circuits determined by the previously established circuit connections. The completed circuits operate stop means of the read-in devices to arrest movement of the actuator racks of the receiving machine in the digital registering positions corresponding to the positions of the respective racks of the sending machine. A novel arrangement of the switching and stop means allows increased time to coordinate the stop operations with movement of the racks.

It will be noted that operation of the receiving machine is initiated during mid-cycle of the sending machine. The read-in to the receiving machine is completed during the first half of its cycle which occurs during the last half cycle of the sending machine. Therefore upon completion of the cycle of the sending machine another cycle may be immediately instituted. Thus normal operating speed is permitted. The invention however will best be understood from the following description with reference to the accompanying drawings in which:

FIG. 3 is a front view with parts broken away of the storage devices of the sending machine and associated switching means.

FIG. 4 is a left end view of the storage and switching means of FIG. 3.

FIG. 5 is a right end view of the storage and switching means of FIG. 3.

Figure 11A:
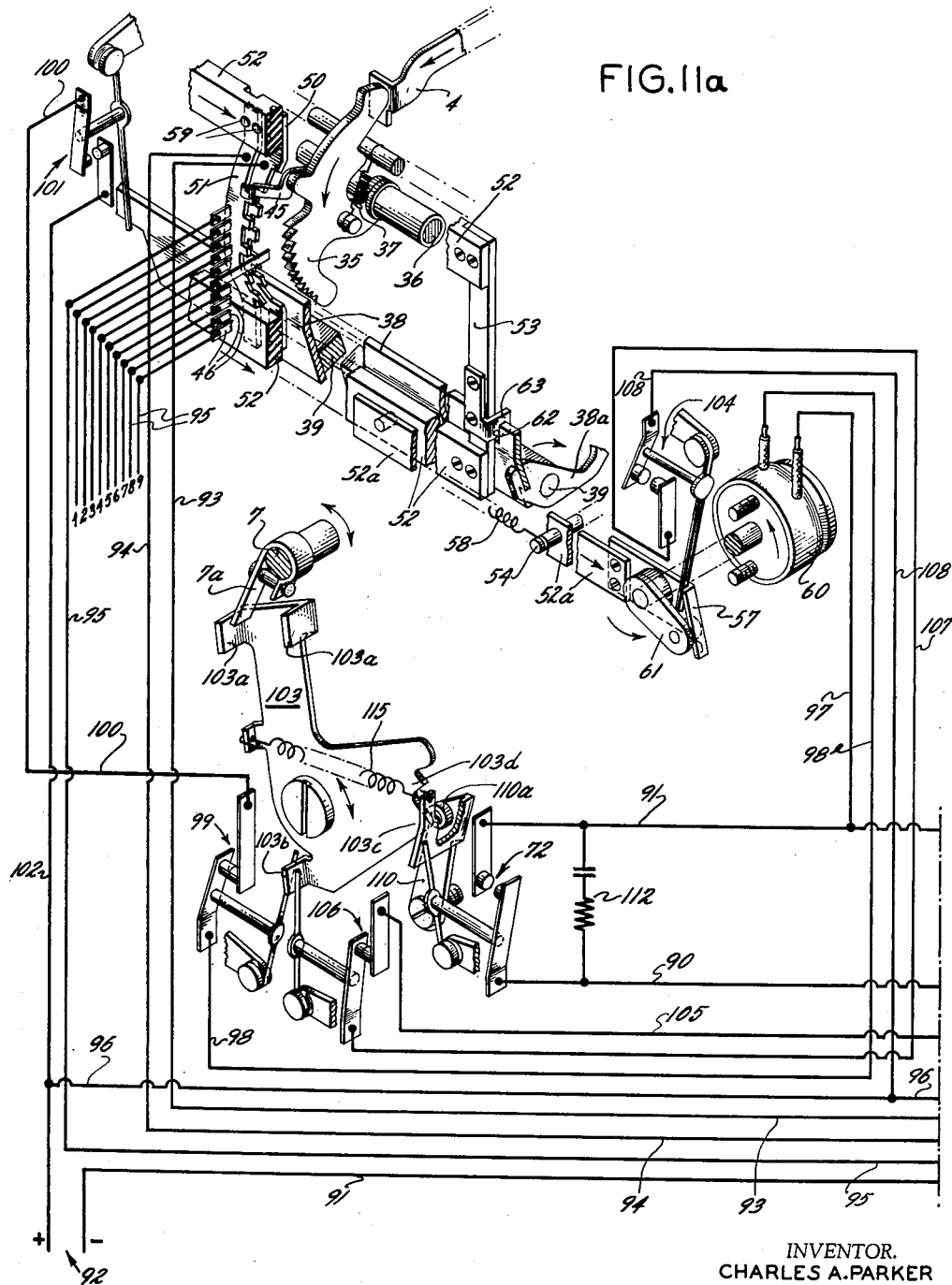
Figure 11B:
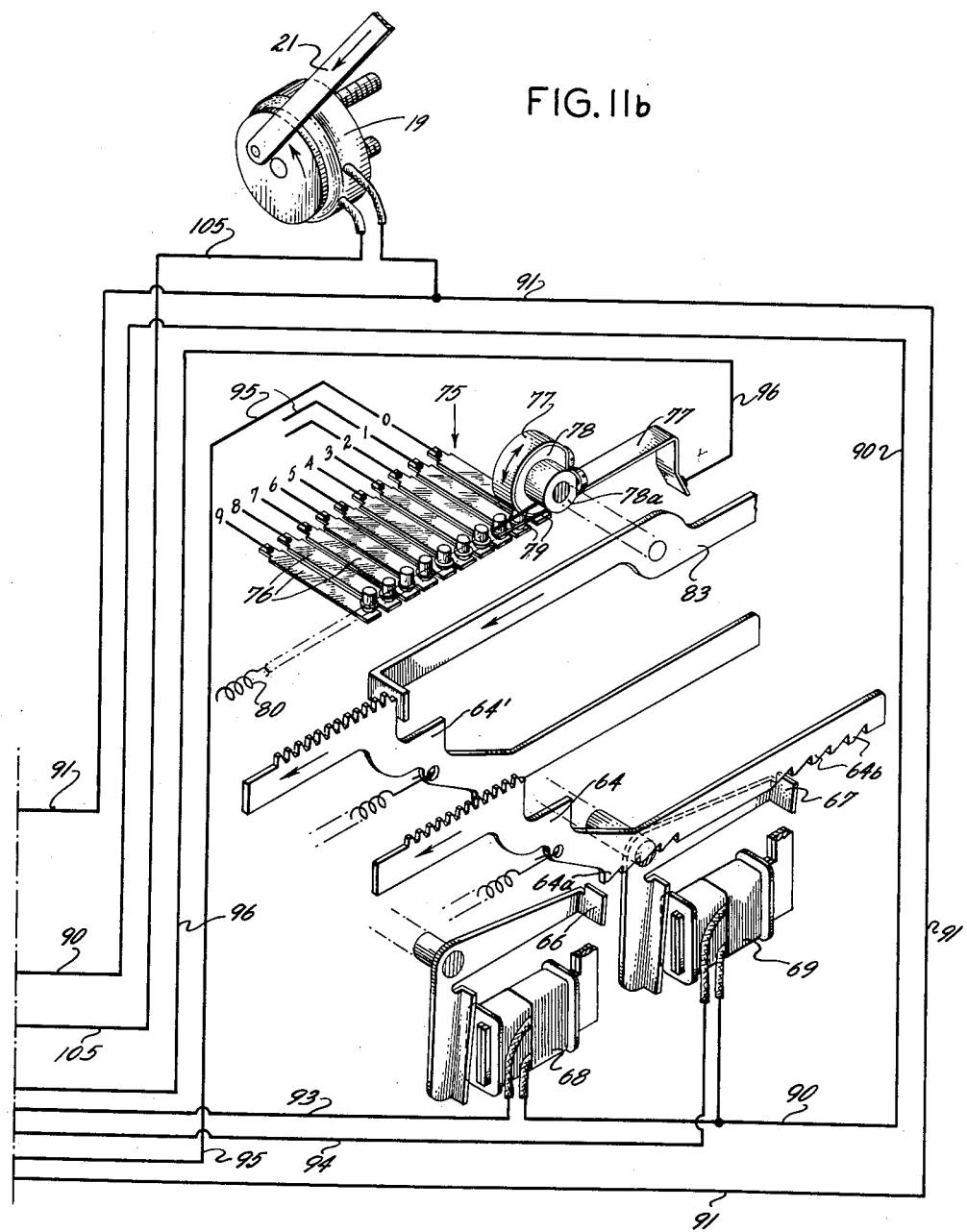

FIGS. 11a and 11b together are a mechanical schematic in perspective of the read-out and read-in devices showing the associated electrical circuitry.

FIG. 12 is a side view of a read-in stop rack associated with each order of the receiving machine.

FIG. 13 is a side view of a modified form of a read-in stop rack associated with each order of the receiving machine.

*The Sending and Receiving Machines*

Figure 1:
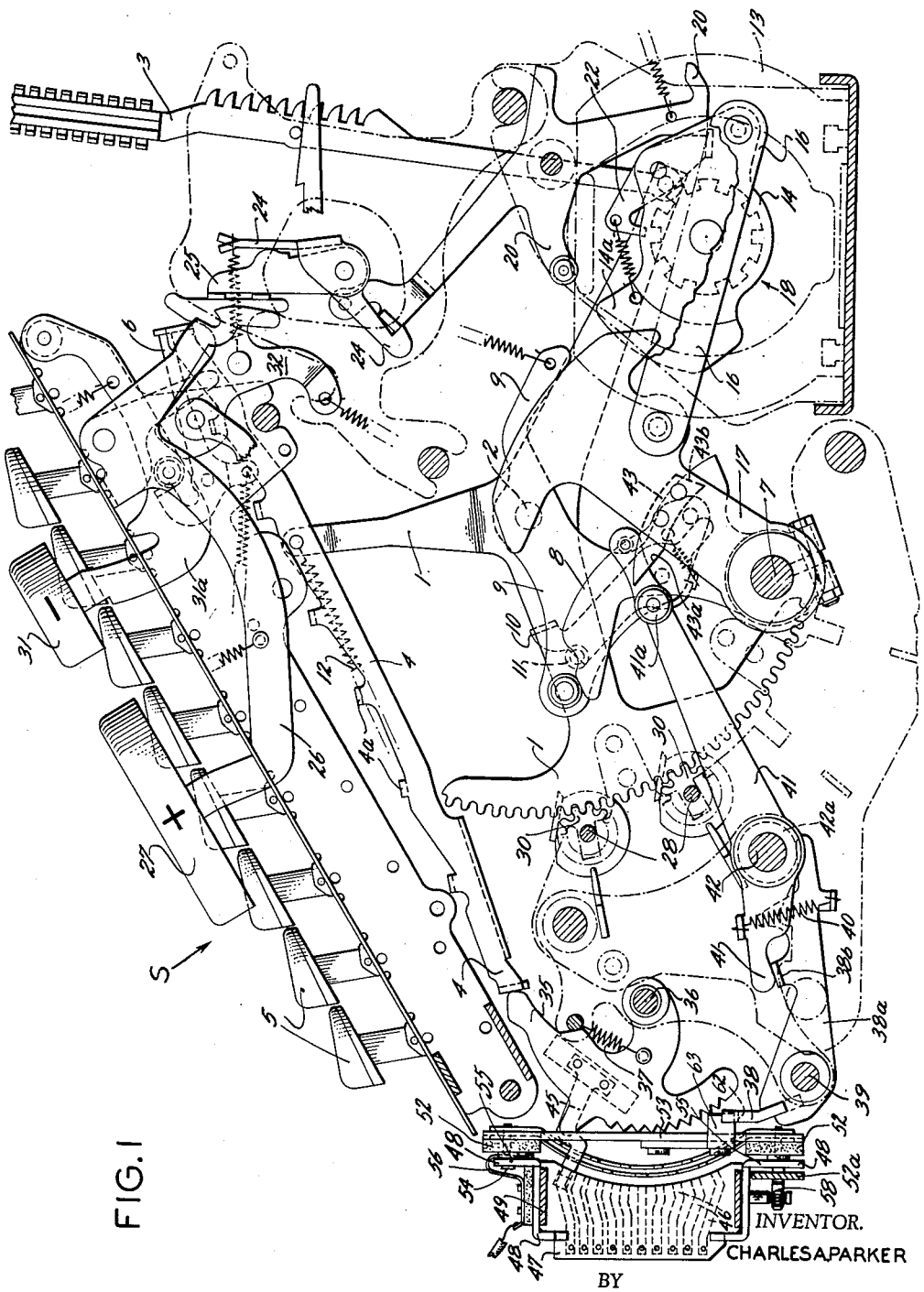
FIG. 1 is a vertical section through an accounting machine embodying the read-out devices.

In the specific embodiment of the invention herein disclosed, both the sending machine S (FIG. 1) and the receiving machine R (FIG. 2) are of the same basic listing calculator type; the machines differing from each other only by the addition of mechanism comprising the devices of the invention. For a complete understanding of the invention, it will be sufficient to describe the basic machine very generally. For a complete disclosure of this type of machine reference is made to Patent 1,932,013 dated October 24, 1933, 1,946,572 dated February 13, 1934 and 2,261,341 dated November 4, 1941.

Each denominational order of the machine is provided with a three armed differential actuator 1 (FIGS. 1, 2) loosely mounted on a shaft 2. Each actuator comprises a forward arm which terminates in a segmental registering rack, a rearward arm which has a lister type bar 3 pivoted thereto, and an upper arm which has pivotal connection with a differential stop bar 4 which cooperates with a column of digit keys 5 to limit the movement of the actuator.

The digit keys are settable in depressed position, and the bottom of the stem of each key, when set, lies in the path of movement of a related lug 4a of the bar 4 associated with the column of the set key 5. Thus bar 4 is advanced a distance proportionate to the value of the set key upon operation of the machine. In any column in which no digit key 5 is depressed, a column latch 6 which is released upon depression of any key in the column by a slide 15 (FIG. 2) will prevent movement of the associated stop bar 4.

A rock shaft 7 is provided with cam means 8 (FIG. 1) for governing the movement of a spring tensioned rocker frame 9 carrying a series of dogs 10 each of which is normally engaged by a stud 11 of one of the actuators 1. As shaft 7 is rotated counterclockwise during the first half of a machine cycle, frame 9 will be rocked about shaft 2 and any of the actuators 1 which have been released by depression of digit keys 5 will be allowed to rotate under influence of springs 12 until they are stopped by the lugs 4a of bars 4 engaging the stems of the keys. Upon clockwise (return) rotation of shaft 7, during the last half of the machine cycle, dogs 10 will return the operated actuators 1 to normal position. This movement of actuators 1 serves to register amounts set in the keyboard in one or more accumulators and to move type bars 3 to set the corresponding amounts at printing line position.

Shaft 7 is rocked by a motor 13 which is connected through suitable gearing and a clutch 18 to a crank 14 which has link connection 16 with an arm 17 fast on shaft 7. Thus as crank 14 is rotated, shaft 7 will be rocked by arm 17 through link connection 16.

Motor operation is controlled by motor bars or keys through a clutch lever 20 which is adapted to close contact members (not shown) in the motor circuit when said lever is moved out of restraining engagement with a pawl 22 which is then spring operated to engage clutch 18. Lever 20 is spring biased to release clutch pawl 22 but is normally restrained by a latch 24. Latch 24 is controlled by a trigger 25 lying in the path of movement of a lever 26 which is connected with a plus bar 27. Upon depression of bar 27, lever 26 will operate trigger 25 to release latch 24. Consequently, clutch lever 20 will be spring moved from engagement with pawl 22 which will be spring operated to engage clutch 18.

Upon release of bar 27, latch 24 will be restored under spring action into latching position, and toward the end of the machine cycle, an extension 14a of crank 14 will engage a roller of clutch lever 20 to rock said lever clockwise to latched position. This movement of lever 20 will break the motor circuit (not shown) and bring its end into the path of movement of pawl 22 to disengage clutch 18 and terminate the cycle.

As more fully disclosed in reference Patent 1,946,572, during operation of plus bar 27, accumulator shafts 28 will be moved to disengage accumulator gears 30 from the racks of actuators 1 before said racks are initially moved, and will be moved to reengage gears 30 while the racks lie in the extreme counterclockwise positions permitted by keys 5 and bars 4. As shaft 7 and the racks are restored, the value set in the keyboard will be additively entered into the accumulators.

A minus bar 31 is located adjacent plus bar 27 and is connected with a pivotally mounted arm 31a. Upon depression of minus bar 31, a roller on arm 31a will engage and rock a spring biased plate 32 clockwise to effect operation of trigger 25 to release latch 24 and initiate operation of the machine.

As set forth in the above noted Patent 1,946,572 operation of minus bar 31 will adjust devices for changing the time at which accumulator gears 30 are shifted out of and into mesh with the actuator racks so that the gears will remain in engagement during the initial stroke of the racks and are thereafter disengaged before the return stroke of the racks, and consequently register subtractively the amounts set in the keyboard.

A total is taken as fully disclosed in Patent 2,261,341 of reference, in which operation of a total key (not shown) effects release of differential stop bars 4 and actuators 1. The racks of actuators 1 will therefore rotate the accumulators subtractively until suitable lugs on the accumulator wheels are engaged with zero stop members. This will set the total (the amount subtracted from the accumulator wheels) in type bars 3 following which clutch 18 will be engaged to effect a machine cycle. During the cycle, the type hammers will be tripped to print the total and after this actuators 1 and bars 4 will be restored by oscillating frame 9 in its return stroke before which the accumulator wheels will be disengaged from the racks of actuators 1.

Associated with each bar 4 is a storage or stop sector 35 (FIGS. 1, 2, 7, 8, 11a). These sectors are used to control the extent of excursions of bars 4 in negative total and sub-total taking operations as fully disclosed in Patents 1,915,296 issued August 22, 1931, and 2,050,302 issued August 11, 1936. The present invention utilizes these sectors with other devices, as will be described later, in establishing circuit connections in accordance with digital values entered in or totaled from the accumulators.

Sectors 35 are loosely mounted on a transverse shaft 36 and normally are yieldably held by individual springs 37 in clockwise raised position in engagement with the front ends of bars 4. Thus upon forward movement of bars 4, sectors 35 are adjusted counterclockwise to positions corresponding to the forward excursions of the bars. After bars 4 have completed their forward excursions, a normally disengaged bail 38 is operated to engage suitable serrations at the front of sectors 35 to lock them in positions corresponding to the 0–9 digital values registered in or totaled from the respective orders of the accumulator.

Bail 38 is pivotally mounted on a transverse shaft 39 and has extending rearwardly therefrom an operating arm 38a. Arm 38a is yieldably connected by a spring 40 to a forwardly extending arm of a lever 41 which is fulcrumed on a shaft 42. Normally spring 40 holds arm 38a counterclockwise with its rear end engaging a limit stop comprising a collar 42a on shaft 42. Consequently bail 38 is normally held counterclockwise and disengaged from storage sectors 35. Furthermore spring 40 normally holds lever 41 counterclockwise with a forwardly extending arm thereof engaging a limit stop comprising a lug 38b of arm 38a. Adjacent the rear end of a rearwardly extending arm of lever 41 is a roller 41a which is adapted for engagement by a cam plate 43 carried by arm 17 which is fast on rock shaft 7.

At the start of a machine cycle, as shaft 7 and arm 17 are rocked counterclockwise, a lower cam edge 43a of cam plate 43 will engage roller 41a and rock lever 41 clockwise against the urge of spring 40. As arm 17 continues in its counterclockwise movement, roller 41a will be engaged by the lower edge of cam plate 43. As the machine completes its first half cycle, cam plate 43 will be carried beyond roller 41a and lever 41 will be rocked counterclockwise to normal by spring 40.

At the start of the return clockwise movement of shaft 7 and arm 17, which occurs as the last half of the cycle begins, an upper cam edge 43b of plate 43 will engage roller 41a and rock lever 41 counterclockwise. In the counterclockwise movement of lever 41, its forward arm engaging lug 38b will rock arm 38a and bail 38 clockwise against the urge of spring 40 to lock sectors 35 in adjusted position. This operation occurs before bars 4 have started their return movement, and therefore sectors 35 will be locked in adjusted positions corresponding to the values entered in or totaled from the accumulator.

As the machine continues in the last half cycle of operation, the upper edge of cam plate 43 will be engaged with roller 41a to hold lever 41 rocked and consequently hold sectors 35 in locked adjusted position. As the machine completes the cycle, plate 43 will be moved beyond roller 41a to release lever 41. Bail 38 will then release sectors 35 which will be restored clockwise by springs 37.

*The Read-Out Storage and Circuit Selection Devices*

Means is operable in conjunction with storage sectors 35 (FIGS. 1, 3, 6–8, 11a) of the sending machine to establish connections for circuits representative of the digital values registered or totaled in each order of the machine.

Mounted on an insulation block on the left side (FIGS. 3, 6) of each sector 35 is a resilient contact arm 45. Mounted to the left on contact arm 45 by electrically conductive spacers is a contact arm 45a having thereon a contact block 45b.

Each contact arm 45 is adapted for engagement with any one of a series of ten printed circuitry conductive strips 46 corresponding to the 0–9 digital value storage positions of the associated storage sector 35. The series of conductive strips 46 is printed on a fixed insulating board or panel 47 and is thereby normally located in a vertical plane a short distance to the right (FIG. 3) of arm 45. To secure panels 47, their upper and lower ends respectively are anchored in a pair of transversely extending angle plates 48 (FIGS. 1, 3), the ends of which are connected by vertically disposed brackets 49 which are secured to the machine side frames. In each panel 47, at the front end of each strip 46 is a terminal in the form of a rivet or stud (FIGS. 1, 7) to which a lead is attached as shown in FIG. 11a.

When each storage sector 35 is in normal clockwise position (FIGS. 1, 7) its contact arm 45 will be transversely aligned to the left of the uppermost or 0 strip 46 of the associated panel 47. When the sector is rotated counterclockwise in a registering or total taking operation, it will be locked by bail 38, as previously described, to locate contact arm 45 in transversely aligned position with respect to the strip 46 corresponding to the digital value registered or totaled in that order.

Means is provided to move resilient contact arms 45 toward the right (FIGS. 3, 6) to engage the transversely aligned contact strips 46 thereby selecting circuits which will subsequently control operation of the read-in means as later described. This means comprises a pair of arcuate contact plates 50 and 51 associated with each pair of contact arms 45 and 45a. Contact plates 50 and 51 are secured at their upper and lower ends by a pair of transversely extending insulation bars 52 which are connected at their respective ends by vertical plates 53.

The frame for plates 50, 51 comprising bars 52 and plates 53 is adjustable transversely of the machine. To provide for this adjustment a series of studs 54 (FIGS. 3, 6) extend forwardly from transverse insulation bars 52. These studs 54 engage transverse slots in lugs 55 which extend vertically from the respective angle plates 48 fixed with respect to the machine framing. A spring 58 FIGS. 3, 6, 11a) attached to a rightwardly extending arm 52a fixed on lower bar 52 normally holds the frame comprising bars 52 and plates 50, 51 secured thereon in the leftmost adjusted position as determined by engagement of studs 54 with the left ends of the slots of lugs 55.

The right edge of plate 50 comprises a series of five teeth 50a. These teeth correspond to the even digits 0, 2, 4, 6, and 8 whereas the right edge of plate 51 comprises a series of five teeth 51a corresponding to the odd digits 1, 3, 5, 7, and 9. When the parts are in normal leftmost adjusted position, the ends of teeth 50a and 51a are in a plane immediately to the left (FIGS. 3, 6) of contact block 45b of arm 45a. When a storage sector 35 is in zero registering position the associated contact block 45b will be transversely aligned with the uppermost or 0 tooth 50a of the associated contact plate 50. Consequently, if plates 50, 51 are moved to the right, tooth 50a will engage block 45b thereby establishing a contact and will at the same time move resilient arms 45a and 45 toward the right. Movement of arm 45 toward the right will bring it into engagement with the uppermost or 0 contact strip 46 of the associated panel 47. A connection will therefore be made between plate 50 and upper conductive strip 46 which is included in a circuit for the read-in devices as later described. In this operation, block 45b will pass freely between a space between teeth 51a thereby preventing a connection to be made between plate 51 and strip 46.

If a sector 35 is located in the digit 1 registering position, contact block 45b will be transversely aligned with the uppermost or digit 1 tooth 51a of plate 51. Consequently, upon movement of plates 50, 51 to the right, a connection will be made between plate 51 and the second or digit 1 conductive strip 46 of panel 47. In this operation, a tooth space of teeth 50a will prevent contact by plate 50. Thus it will be seen that if a sector 35 is in an even digit storage position, rightward movement of plates 50, 51 will make a connection between the corresponding conductive strip 46 and contact plate 50 whereas if sector 35 is in an odd digit registering position, a connection will be made between the corresponding conductive strip 46 and plate 51.

As shown in FIG. 11a, a lead is connected to each of the plates 50, 51. To correct the leads, suitable brushes 56 mounted on an insulation strip on upper angle plate 48 (FIGS. 3, 6) engage studs 59 in the upper ends of plates 50, 51. These brushes are of sufficient width to permit transverse adjustment of plates 50, 51 without disengaging studs 59.

Means for adjusting plates 50, 51 rightwardly comprises a rotary solenoid 60 (FIGS. 3, 6, 11a) which may be of the well-known Ledex type. Solenoid 60 is operated as later described in response to movement of bail 38 to latch sectors 35 in adjusted position. The armature of solenoid 60 drives a rotary operating arm 61 having a roller at its end which engages a cam plate 57 fixed at the right end of arm 52a. Upon operation of solenoid 60, arm 61 will be rotated counterclockwise thereby moving cam plate 57, arm 52a and the frame comprising bars 52 on which plates 50, 51 are mounted toward the right. Therefore, a connection will be made in each order of the machine between a conductive strip 46 corresponding to the value registered or totaled in said order and a plate 50 if the value is even and plate 51 if the value is odd.

As later described, solenoid 60 will hold plates 50, 51 in engaged position until the receiving machine R has completed a first half cycle of operation during which its actuators 1 will be stopped in positions corresponding to the positions of storage segments 35 of the sending machine S. If the sending machine should finish its cycle before the above operation is completed, sectors 35 would be released by bail 38. Therefore, latching means is provided to prevent bail 38 of the sending machine from releasing adjusted storage sectors 35 until plates 50, 51 are restored upon deenergization of solenoid 60.

Latching means for bail 38 comprises a rearwardly extending finger 63 (FIGS. 8, 11a) which is mounted at the lower end of the right end plate 53. Finger 63 normally engages a slot 62 at the upper edge of bail 38. When bail 38 is rocked clockwise to engage the serrations of sectors 35, slot 62 will be moved to the rear of finger 63. Consequently, when plates 50, 51 are moved to engage contact arms 45 with strips 46, finger 63 will be moved to the right of slot 62 and in position to block bail 38 from being restored until plates 50, 51 are restored to permit disengagement of contact arms 45.

The Read-In Actuator Stop Devices

A cycle of operation of receiving machine R will be initiated by a rotary solenoid 19 (FIGS. 2, 11b), as later described, upon operation of solenoid 60 to adjust contact plates 50, 51 of the sending machine to make the aforesaid circuit connections of contact arms 45 with conductive strips 46. As noted before, operation of solenoid 60 will occur during mid-cycle of sending machine S in response to movement of bail 38 to lock storage sectors 35.

Rotary solenoid 19, which may be of the well-known Ledex type, has the lower end of a link 21 attached to its rotary armature. The upper end of link 21 has slot and pin connection with a slide 23 which at one end is connected to latch 24. Therefore upon operation of solenoid 19, link 21 is lowered thereby moving slide 23 to release latch 24 and initiate a cycle of the receiving machine.

Means must be provided to release column latches 6 to permit operation of actuators 1 during the machine cycle. To this end, a bail 29 engages the rear ends of release slides 15. Bail 29 is carried by a rock shaft 33 on which is a rearwardly extending crank 34. Extending downwardly from the end of crank 34 is a link 44 which is connected at its lower end intermediate the ends of link 21. Consequently, as link 21 is moved downwardly, link 44 will rock crank 34 and shaft 33 thereby operating bail 29 to move slides 15 forwardly and release column latches 6.

During the first half cycle of operation of the receiving machine as actuators 1 are moved in their excursions, stop means is operated to arrest movement of said actuators in positions corresponding respectively to the positions of storage sectors 35 of the sending machine. The stop means for each actuator 1 of the receiving machine comprises a rack 64 (FIGS. 2, 11a, 12) having teeth at its upper edge which engage an intermediate gear 65 which meshes with the segmental rack teeth of the actuator. Each rack 64 is spring urged forwardly in the direction in which it will be moved upon initial operation of actuator 1 thereby augmenting the operation of spring 12 of said actuator.

At the under edge of each rack 64 is a series of teeth forming stop edges 64a corresponding respectively to the even digits 0-8 inclusively as indicated in FIG. 12, and a series of teeth forming stop edges 64b corresponding respectively to the odd digits 1-9 inclusively. It will be noted that the distance between each adjacent pair of stop edges is equal to the distance rack 64 will travel upon movement of the associated actuator 1 in two digital steps of registration.

Stop detents 66 and 67 are located immediately below edges 64a and 64b respectively. An armature of an electromagnet 68 is adapted to raise detent 66 into the path of movement of stop edges 64a and the armature of an electromagnet 69 is adapted to raise detent 67 into the path of movement of stop edges 64b.

If detent 66 is raised with rack 64 in normal rearward position, said detent will be in position to be engaged immediately by the 0 stop edge 64a when actuator lever 1 is released for registering operation. Therefore there will be 0 registration in that order. If detent 67 is raised with rack 64 in normal rearward position, said detent will be one-half tooth space forwardly of the 1 stop edge 64b. Therefore actuator 1 will be afforded one digital step of movement before it is arrested by engagement of detent 67 with the 1 stop edge 64b.

In view of the above, electromagnets 68 and 69 of the receiving machine in the orders corresponding to the orders of the sending machine in which storage segments 35 stand at 0 and 1 positions respectively will be energized before actuators 1 of said receiving machine are moved in the read-in cycle of operation. After this, as later described, racks 64 will be moved forwardly in the read-in cycle, the racks of the orders in which magnets 68 have been energized being immediately arrested in 0 position and the racks of the orders in which magnets 69 have been energized being permitted to move to 1 position.

After racks 64 have begun their forward excursions, the unraised detents 66 will be raised in timed relation with the movement of said racks to engage the 2, 4, 6, or 8 stop edges 64a if the corresponding storage sectors 35 in the sending machine are locked in those respective even digit positions. Likewise unraised detents 67 will be raised in timed relation with the movement of said racks to engage the 3, 5, 7, or 9 stop edges 64b if the corresponding storage sectors 35 in the sending machine are locked in those respective odd digit positions.

It will be noted that a detent 66 or 67 may be started in movement to raised position for engagement with a given stop edge 64a or 64b immediately after the preceding stop edge has moved forwardly of said detent. At this time, the stop edge which is to be engaged will be almost two digital steps of movement from the detent. Therefore more than double the time is available to move the detent into stopping position than would be available if only a single detent were employed acting upon a single set of stop edges spaced one digital space from one another. Thus more than double the machine speed is permitted with the double detent arrangement for a given level of electrical energy operating the electromagnets for the stopping means. From the above, it will be evident that more than two stops may be employed for each rack 64 to permit proportionately greater machine speed. For example, one detent may be employed to stop the rack in the 0, 3, 6, and 9 positions, a second detent for the 1, 4, and 7 positions and a third detent for the 2, 5, and 8 positions.

FIG. 13 shows an alternative arrangement wherein rack 64 is provided with a single set of teeth forming stop edges 64c for the two detents 66, 67. The distance between each adjacent pair of stop edges 64c is equal to the distance between each adjacent pair of stop edges 64a or 64b of FIG. 12.

As indicated in FIG. 13, the frontmost stop edge 64c corresponds to 0 and operates only in conjunction with detent 66. The rearmost stop edge corresponds to 9 and operates only in conjunction with detent 67. Each of the intermediate stop edges corresponds to two digits; namely, (1—2), (3—4), (5—6), and (7—8) and operates in conjunction with both detents 66 and 67.

Detent 66, operable for even digits 0, 2, 4, 6, and 8, is in the same relative position with respect to stop edges 64c of FIG. 13 corresponding to digits 0 (1—2), (3—4), (5—6), and (7—8) as is its position with respect to stop edges 64a of FIG. 12 and therefore has equivalent stopping operation in both arrangements. Detent 67 operable for odd digits 1, 3, 5, 7, and 9 is in the same relative position with respect to stop edges 64c of FIG. 13 corresponding to digits (1—2), (3—4), (5—6), (7—8), and 9 as is its position with respect to stop edges 64b of FIG. 12 and therefore has equivalent stopping operation.

From the above, it will be evident that the principle of operation of the arrangement of FIG. 13 corresponds to that of FIG. 12 and that space requirements would determine the choice of design.

The Sequence Switching Means

The circuits, representative of the digital values registered or totaled in each order of the sending machine, and for which connections are established as previously described, are adapted to operate electromagnets 68, 69 of the receiving machine. The circuits representative of the even digits 0, 2, 4, 6, and 8 are adapted to operate magnets 68 of the corresponding orders of the receiving machine and the circuits representative of the odd digits 1, 3, 5, 7, and 9 are adapted to operate magnets 69 of the corresponding orders of the receiving machine. These circuits, with the exception of the 0 and the 1 circuits and which will be described later, are completed by a sequence switch 75 (FIGS. 2, 9, 10, 11b) which operates in time with racks 64 of the receiving machine.

Figure 9:
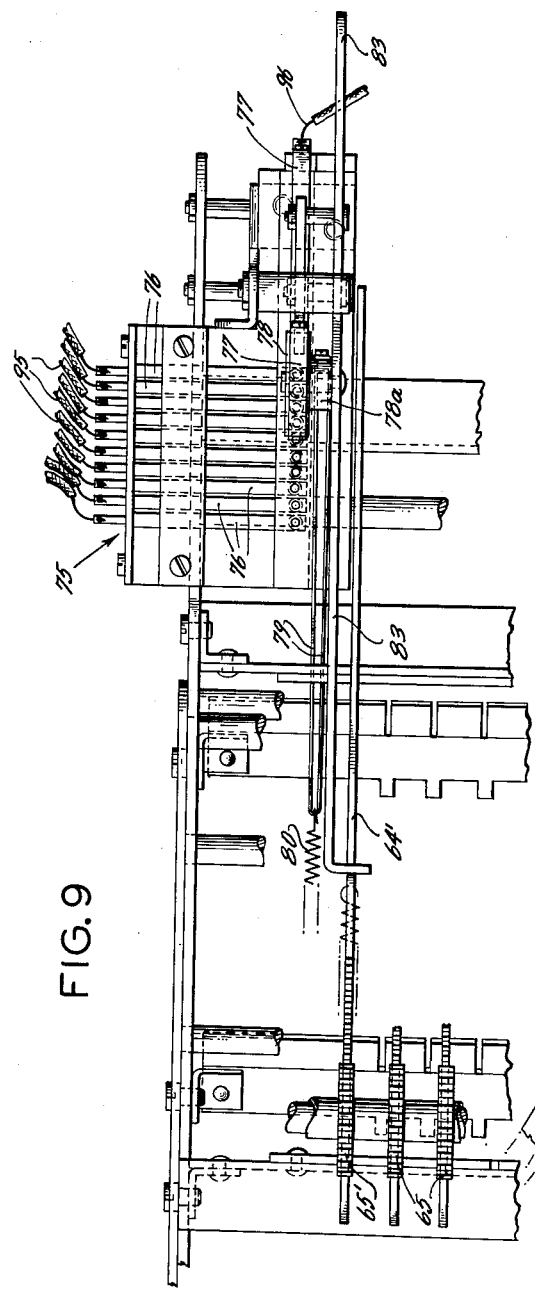
FIG. 9 is a top plan of the sequence switching means controlled by the read-in machine.
Figure 10:
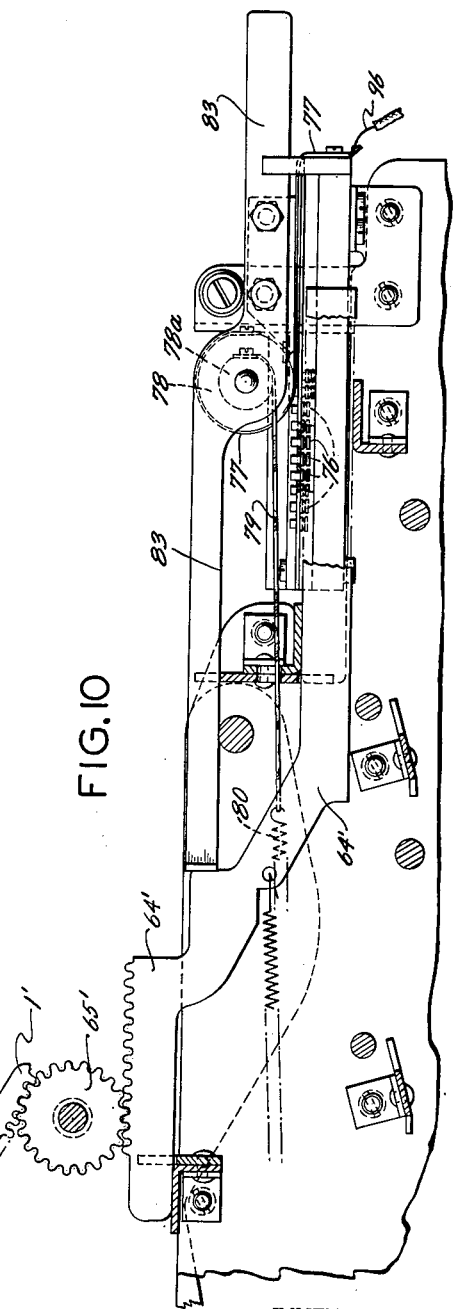
FIG. 10 is a side elevation of the sequence switching means of FIG. 9.

Sequence switch 75 comprises a series of ten resiliently depressible contacts 76 corresponding to the digits 0-9 respectively as indicated in FIGS. 9, 11b. All of the circuits representative of a given digit and for which connections have been established in the sending machine are completed by closure of the single contact 76 which corresponds to said digit.

Means for closing contacts 76 comprises a common conductor in the form of a flexible contact band 77 having one end encircling and attached to a roller 78, and having the other end extending rearwardly and secured to an insulating support for the contacts. Normally roller 78 is restrained in rearward position, as later described, to engage band 77 with the two rearmost contacts 76, i.e., the 0 contact and the 1 contact. It will be noted that the 0 and the 1 contacts are never disengaged and therefore are in effect permanent electrical connections which are included in view of uniformity of parts and to simplify the wiring procedure.

An operating band or cable 79 has one end attached and wound reversely with respect to band 77 on a reduced roller portion 78a of roller 78. The other end of cable 79 is biased forwardly by a spring 80 to bias roller 78 in the same direction. Therefore if roller 78 is released, it will be rotated in forward counterclockwise direction to bring band 77 in engagement with the successive higher order digit contacts 76 while maintaining engagement with the lower orders.

In the above operation, cable 79, wound reversely to band 77 will impart a counterrotational torque to roller 78, i.e., a clockwise torque. This torque, however, with respect to the counterclockwise torque will be proportional to the ratio of the radius of reduced roller portion 78a to that of roller 78. As a result, the energy of spring 80 will be proportionally divided to keep contact band 77 taut in engagement with contacts 76 and to rotate roller 78 in forward counterclockwise direction. As the energy of spring 80 decreases upon forward movement of roller 78, the energy expended to keep band 77 taut is proportionally decreased thus insuring optimum performance from a spring charged sufficiently to perform the operation.

Sequence switch 75 is controlled by means comprising an auxiliary non-registering actuator 1' (FIGS. 2, 10) located in the receiving machine to the left of the highest order actuator 1. Actuator 1' is operated at the same speed in time with actuators 1 by the same drive means but invariably makes a complete excursion from 0 to 9 position upon each machine cycle. Acutator 1' drives an intermediate gear 65' which engages the teeth of a control rack 64' (FIGS. 9, 10, 11b) similar to racks 64 but without means for arresting its movement in intermediate positions. Rack 64' therefore travels at the same speed in time with racks 64 but always from 0 to 9 position during each machine cycle.

Engaging a shoulder of rack 64' and extending rearwardly is a slide 83 on which roller 78 of sequence switch 75 is mounted. Consequently roller 78 is normally held to the rear and will move forwardly with rack 64' under the urge of spring 80.

It will be recalled that conductor 77 permanently engages both the 0 and 1 contacts 76. At the start of a machine cycle before racks 64, 64' are moved, a master switch 72 is closed, as later described, and will remain closed until racks 64, 64' have completed their forward excursions. As a result, if the connections 46 (FIGS. 1, 7) in the sending machine for any of the circuits representative of 0 and 1 have been established, said circuits, later described, will be completed and magnets 68 and 69 respectively in the corresponding orders of the receiving machine will be operated to raise the associated detents 66 and 67.

After the above operation, racks 64, 64' will move forwardly in the first half of the machine cycle and in the orders where detents 66 have been raised, racks 64 will be immediately arrested in 0 position, while in the orders where detents 67 have been raised, racks 64 will be arrested in 1 position.

Immediately after the 0 stop edges 64a (FIGS. 11b, 12) have passed forwardly of detents 66 in the forward movement of racks 64, roller 78 of switch 75 will have moved sufficiently to close the 2 contact 76. This will complete the circuits representative of 2 for which connections have been established in the sending machine. Electromagnets 68 of these completed circuits therefore are operated to raise associated detents 66 into the respective paths of 2 stop edges 64a of racks 64. As noted, this will occur while 2 edges 64a are nearly two full digital steps of movement to the rear of detents 66. In like manner, the 3 contact 76 will be closed by band 77 immediately after the 1 stop edges 64b pass forwardly of detent 67. Thus contacts 76 will be successively closed to complete circuits, in which connections have been established in the sending machine, representative alternately of the successive higher order even and odd number digits.

At mid-cycle of the receiving machine, actuators 1 will have completed their excursions and will have been arrested in digital registering positions corresponding to the positions in which the corresponding storage sectors 35 of the sending machine were locked. At this time master switch 72 will open to break all of the circuits for magnets 68, 69 to release detents 66, 67 and during the last half of the machine cycle the parts will be restored in the usual manner.

When the receiving machine has completed the first half cycle during which the read-in is effected, the sending machine operating at substantially the same speed will have completed its full cycle. Another cycle of the sending machine may therefore be immediately initiated as the receiving machine is completing its cycle.

*The Circuits Representative of the Stored Digital Values*

The circuits, representative of the even digits 0, 2, 4, 6, and 8 and the odd digits, 1, 3, 5, 7, and 9 for electromagnets 68 and 69 respectively of one order of the receiving machine, for which connections are established in accordance with the settings of storage sector 35 of the corresponding order of the sending machine, will now be described with reference to the schematic view comprising FIGS. 11a and 11b. It will be understood that these circuits are duplicated for each order of the machines. Furthermore, it will be understood that sequence switch 75 is common to all of the orders and therefore connections to the switch for each of the orders will be in parallel with the connections shown in FIGS. 11a, 11b.

One side of each of the electromagnets 68 and 69 is connected in parallel by a common lead 90 to normally opened master switch 72 which is connected through a lead 91 to the negative side of a suitable source of electrical potential 92. The other side of magnet 68 is connected by a lead 93 to even digit contact plate 50. The other side of magnet 69 is connected by a lead 94 to odd digit contact plate 51.

Plate 50, as heretofore described, may be connected through contact arm 45 to any one of the even number contact strips 46 if storage sector 35 is locked in an even digit registering position; whereas contact plate 51 may be connected through arm 45 to any one of the odd number contact strips 46. Contact strips 46 are connected respectively to the corresponding digital value contacts 76 of sequence switch 75 by leads 95. Contact band 77 of switch 75 is connected by a lead 96 to the positive side of the power source 92.

Upon closure of master switch 72, magnet 68 will be connected to the negative side of the power source through leads 90, 91 and to the positive side of the power source through lead 93, contact plate 50, contact arm 45, an even number contact strip 46, the lead 95 connected thereto, the even number contact 76 connected with lead 95, contact band 77 and lead 96. Thus a circuit may be completed for magnet 68. In FIGS. 11a, 11b, storage sector 35 is in 0 position and contact arm 45 would therefore connect plate 50 with 0 contact strip 46 and therefore magnet 68 would be operated to arrest rack 64 in 0 position.

Also upon closure of master switch 72, electromagnet 69 for the odd number digits will be connected through leads 90, 91 to the negative side of power source 92. If storage sector 35 is locked in an odd number position, a circuit for magnet 69 will be completed through lead 94, contact plate 51, contact arm 45, an odd number contact strip 46, a lead 95, the corresponding odd number contact 76, contact band 77 and lead 96.

*Operation*

Operation of the bail 38 to latch storage sectors 35 in adjusted position will initiate the read-out, read-in operation which will be initiated and effected as follows with reference to FIGS. 11a, 11b.

In response to movement of bail 38 to latching position, rotary solenoid 60 will be operated to establish the circuit connections representative of the stored digital values by rightward adjustment of plates 50, 51 as previously described.

One side of solenoid 60 is connected to the negative side of power source 92 by a lead 97 connected to lead 91. The other side of solenoid 60 is connected by a lead 98 to a normally closed switch 99 which is connected through a lead 100 to a normally open switch 101 which through a lead 102 is connected to the positive side of the power source.

Normally closed switch 99 may be of the well-known micro type, and is biased toward closed position and is controlled as described later by a rock lever 103. Rock lever 103 is biased clockwise by a spring 115 but normally is restrained in counterclockwise position (FIGS. 2, 11a) by a depending arm 7a fast on rock shaft 7 of the receiving machine and engaging one of a pair of opposed lugs 103a at the end of an upwardly extending arm of said lever. Switch 101 which also is preferably of the micro type is also biased toward closed position but is normally held open by bail 38 in counterclockwise position.

Upon clockwise movement of bail 38 to latching position, switch 101 will be closed thereby completing a circuit for solenoid 60. Upon operation of solenoid 60 to adjust plates 50 and 51, a normally open switch 104 which may be of the micro type will be closed to complete a circuit for solenoid 19 which initiates a cycle of operation of the receiving machine as previously described.

Solenoid 19 is connected to the negative side of the power source 92 by lead 91 and to the positive side of the power source by a lead 105, a normally closed switch 106 which is controlled by a lever 103, a lead 107 which is connected to normally open switch 104, and a lead 108 which connects switch 104 to the positive side of the power source. Normally closed switch 106 which may be of the micro type is biased toward open position but normally is held closed by a lug 103b at the lower end of rock lever 103.

Upon operation of solenoid 60, cam plate 57 will be moved toward the right as previously described. Switch 104 is biased toward closed position but is normally held open by cam plate 57. Therefore when cam plate 57 is moved toward the right by solenoid 60, switch 104 will be closed completing the circuit for starting solenoid 19.

During the first part of the first half cycle of the receiving machine before actuator racks 1 (FIG. 2) are moved, shaft 7 will rock counterclockwise from engagement with lug 103a thereby permitting a clockwise step of movement of spring urged lever 103. During this initial movement of lever 103, lug 103b will be moved from restraining position and therefore switch 106 will be opened to break the circuit for starting solenoid 19 so that the receiving machine will be given only a single cycle of operation.

Figure 2:
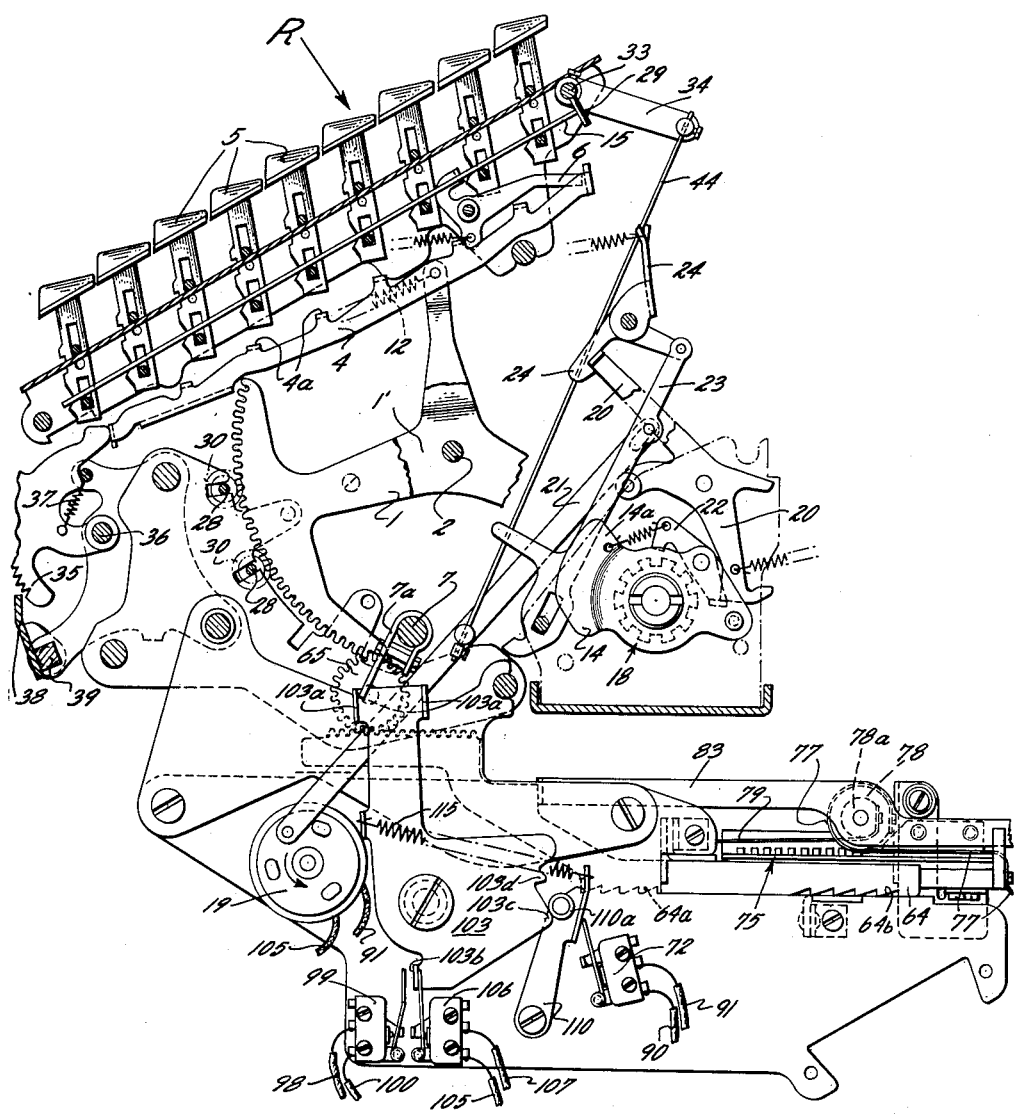
FIG. 2 is a fragmentary vertical section through an accounting machine embodying the read-in devices.
Figure 6:
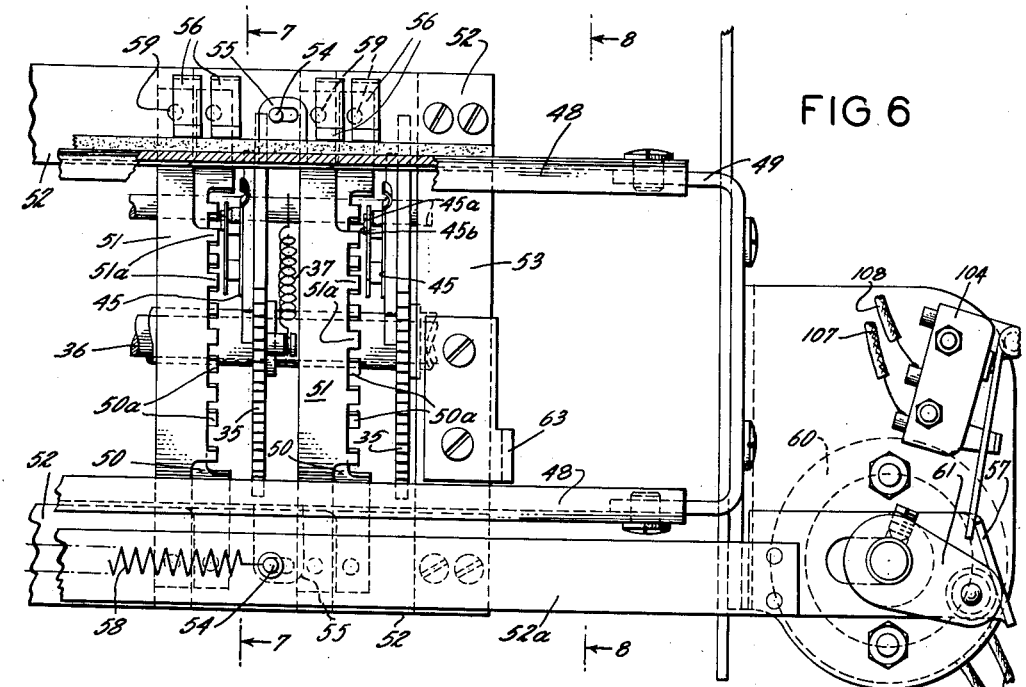
FIG. 6 is a fragmentary enlarged front view of the storage and switching means of FIG. 3.
Figure 7:
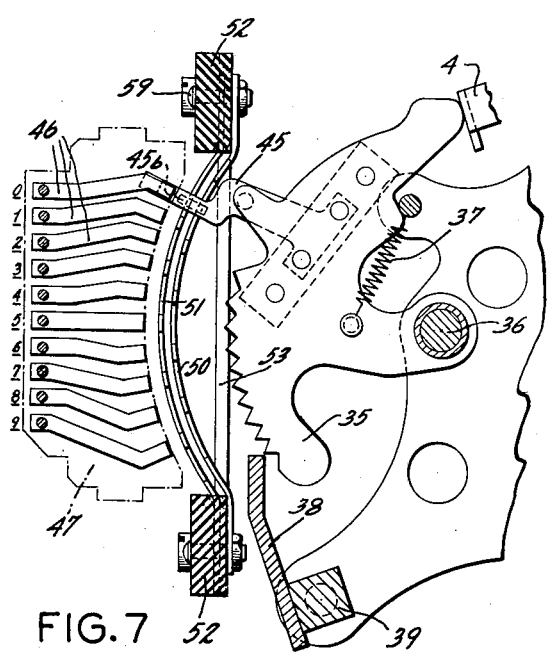
FIG. 7 is a section taken on line 7—7 of FIG. 6 with parts omitted.
Figure 8:
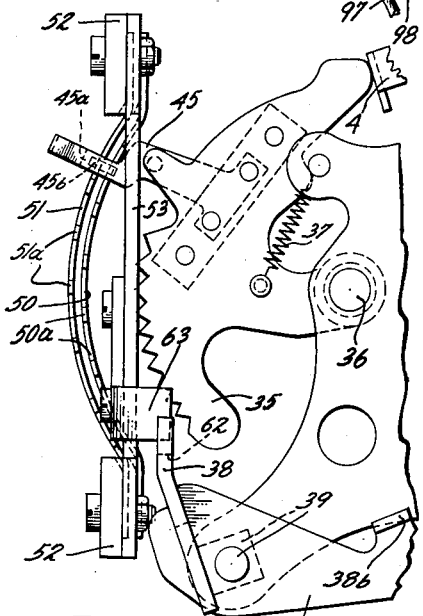
FIG. 8 is a right end view as indicated by line 8—8 of FIG. 6 with parts omitted.

Furthermore, upon initial movement of lever 103 and before actuators 1 and 1' have moved, master switch 72 will be closed so that the circuits for electromagnets 68 and 69 will be energized as previously described. Master switch 72 is biased toward closed position but is normally held opened by an operating arm 110 which is spring biased counterclockwise by spring 115 which biases lever 103 clockwise. A roller 110a is carried at the upper end of arm 110 and engaged by a nose 103c at the end of a rightwardly extending arm of lever 103 as best seen in FIG. 2. Arm 110 therefore is normally held clockwise to disengage switch 72.

Upon initial clockwise movement of lever 103, nose 103c will be moved from engagement with roller 110a thereby permitting counterclockwise movement of arm 110. This will release switch 72 which will thereupon be moved to closed position. In this operation, roller 110a will be seated in a recess between nose 103c and an upper nose 103d. Therefore lever 103 and arm 110 will be restrained from further rocking movement at this time.

As the receiving machine continues in its first half cycle of operation, actuator racks 1, 1' will be operated and the read-out, read-in operation will be effected as previously described. Near the end of the half cycle of operation after actuators 1 of the receiving machine have completed their excursions under control of the stop means comprising detents 66 and 67, arm 7a will engage opposed lug 103a at the upper end of lever 103 and rock said lever a step further in clockwise direction. This step of movement of lever 103 will effect two operations, namely, master switch 72 will be opened to break the circuits for electromagnets 68 and 69 and switch 99 will be opened to break the circuit for solenoid 60 as follows:

During the above step of clockwise movement of lever 103, nose 103d will engage roller 110a thereby rocking arm 110 clockwise and opening switch 72. Immediately following this operation, lug 103b will engage an operating arm of switch 99 thereby opening said switch and breaking the circuit for solenoid 60. Thus, contact plates 50, 51 and bail 38 will be released and restored. From the above it will be seen that solenoid 60 will be held energized to maintain contact plates 50, 51 in adjusted position and segments 35 locked until the receiving machine has completed the read-in operation. If such provision were not made to hold bail 38 locked by solenoid 60 until completion of the read-in cycle, it is possible that bail 38 would be released by completion of the cycle of operation of the sending machine thereby releasing bail 38 and opening switch 101. This would break the circuit of solenoid 60 and plates 50, 51 would be restored before completion of the read-in operation.

A suitable arc suppressor 112 is connected across the terminals of master switch 72. It will be noted that a circuit for either an electromagnet 68 or 69 will have been made in each order of the receiving machine at the end of the read-in operation. Therefore, the characteristics of arc suppressor 112 may be calculated with respect to breaking the circuits in consideration of a constant load at the conclusion of each read-in operation. It will be evident that if it were not for the desirability of this condition when the circuits are broken, magnets 69 need not be operated in the registration of 9 wherein actuators 1 are permitted maximum movement.

A sequence switch which momentarily maintains engagement of contacts 76 could be used in lieu of sequence switch 75 which maintains engagement of the successive contacts 76 until completion of the read-out, read-in operation. In this instance, electromagnets 68, 69 would be energized only long enough to permit detents 66, 67 to be engaged by the respective stop edges 64a, 64b. It is contemplated, therefore, to provide means which will positively maintain detents 66, 67 in engagement with stop edges 64a, 64b respectively after deenergization of magnets 68, 69.

It will be noted from an inspection of the dot-dash raised position of detent 66 in FIG. 12 that the fulcrum point of said detent is below stop edges 64a. Therefore the detent will be positively locked in raised position by the forward pressure of the engaged edge 64a. In the drawings, it will be noted that edges 64a, 64b are in a substantially vertical plane. It will be evident that if the plane of the tooth edges were inclined slightly toward the rear, the locking action with respect to the detents would be further augmented. When racks 64 are restored, detents 66, 67 would drop out by gravity or under the urge of light springs (not shown).

Although only one receiving machine operating in connection with the sending machine is illustrated in the drawings, it will be apparent that a plurality of receiving machines could have electrical connections to the sending machine in parallel with the connections from the receiving machine illustrated in the drawings. Furthermore, it will be understood that although the invention has been illustrated as embodied in a particular type of accounting machine, it is equally applicable for embodiment in other types of machines without departing from its principles of operation. The invention, therefore, is to be restricted only as necessitated by the scope of the appended claims.

I claim:
1. The combination with a sending machine having registering means including an ordinal series of differential digital value actuators and a receiving machine having registering means including an ordinal series of reciprocatory actuator racks each having a series of teeth respectively corresponding to even number digits and a series of teeth corresponding respectively to odd number digits: of means for controlling each actuator rack of said receiving machine to register values corresponding to values registered by the corresponding order actuator of said sending machine comprising; an electrically operable even number detent for engaging any one of said even number teeth to arrest said rack during an excursion in position for the registration of the even number digit corresponding to said engaged tooth, an electrically operable odd number detent for engaging any one of said odd number teeth to arrest said rack during an excursion in position for the registration of the odd number digit corresponding to said engaged tooth, a plurality of circuits for said even number detent each representative of a different even number digit, a plurality of circuits for said odd number detent each representative of a different odd number digit, a first and a second contact in each of said circuits, means operable to close said first contact of the circuit representative of the digital value registered by said actuator of said sending machine, and means operable in time with an excursion of said actuator rack to successively close said second contacts.

2. In an accounting machine or the like; an ordinal series of cyclically operable reciprocatory digital value actuator racks, an electrically operable stop for arresting each rack during an excursion in different positions for the registration of different digits respectively, a plurality of circuits for each stop each representative of a different digital value, a single contact common to each plurality of said circuits representative of the same digital value, selection means for conditioning any one of said circuits for each of said stops for completion upon closure of said contact therein, and means operable in time with an excursion of said actuator racks to successively close and maintain said contacts simultaneously closed.

3. In an accounting machine or the like; a reciprocatory digital value actuator rack, an electrically operable even number stop for arresting said rack during an excursion in positions for registration of the digits 0, 2, 4, 6, and 8 respectively, a circuit representative of each of said digits for said even number stop, an electrically operable odd number stop for arresting said rack in positions for registration of the digits 1, 3, 5, and 7 respectively, a circuit representative of each of said odd number digits for said odd number stop, a first contact in each of said circuits, means for closing a selected one of said first contacts, a second contact in each of said circuits which are representative of the digits 2, 3, 4, 5, 6, 7, and 8, and switching means operable in time with an excursion of said actuator rack to close said second contacts successively.

4. The combination with a sending machine having registering means including an ordinal series of differential digital value actuators and a receiving machine having registering means including an ordinal series of reciprocatory actuator racks each having a series of teeth each corresponding to an even and an odd number digit: of means for controlling each actuator rack of said receiving machine to register values corresponding to values registered by the corresponding order actuator of said sending machine comprising; an electrically operable even number detent for engaging any one of said teeth to arrest said rack during an excursion in position for the registration of the even number digit corresponding to said engaged tooth, an electrically operable odd number detent for engaging any one of said teeth to arrest said rack during an excursion in position for the registration of the odd number digit corresponding to said engaged tooth, a plurality of circuits for said even number detent each representative of a different even number digit, a plurality of circuits for said odd number detent each representative of a different odd number digit, a first and a second contact in each of said circuits, means operable to close said first contact of the circuit representative of the digital value registered by said actuator of said sending machine, and means operable in time with an excursion of said actuator rack to successively close said second contacts.

5. In an accounting machine or the like; a reciprocatory digital value actuator rack having a series of teeth each corresponding to an even number digit and a series of teeth each corresponding to an odd number digit, an even number detent operable to engage any one of said even number teeth and arrest said rack during an excursion in position for the registration of the even number digit corresponding to said engaged tooth, and an odd number detent operable to engage any one of said odd number teeth and arrest said rack during an excursion in position for the registration of the odd number digit corresponding to said engaged tooth, and selection means including means operable in time with an excursion of said rack to cause operation of either said even number stop or said odd number stop to arrest said rack in any one of its respective even number or odd number registering positions.

6. In an accounting machine or the like; a reciprocatory digital value actuator rack having a series of teeth each corresponding to an even and an odd number digit, an even number detent operable to engage any one of said teeth and arrest said rack during an excusion in position for the registration of the even number digit corresponding to said engaged tooth, and an odd number detent operable to engage any one of said teeth and arrest said rack during an excursion in position for the registration of the odd number digit corresponding to said engaged tooth, and selection means including means operable in time with an excursion of said rack to cause operation of either said even number stop or said odd number stop to arrest said rack in any one of its respective even number or odd number registering positions.

References Cited in the file of this patent

UNITED STATES PATENTS

| 1,005,555 | Kettering | Oct. 10, 1911 |
| 1,318,397 | Malcher | Oct. 14, 1919 |
| 1,930,871 | Ball | Oct. 17, 1933 |
| 2,325,966 | Mills et al. | Aug. 3, 1943 |
| 2,332,755 | Robertson et al. | Oct. 26, 1943 |
| 2,335,911 | Buhler | Dec. 7, 1943 |
| 2,413,883 | Mills et al. | Jan. 7, 1947 |
| 2,477,722 | Coe et al. | Aug. 2, 1949 |
| 2,497,784 | Mehan et al. | Feb. 14, 1950 |
| 2,761,620 | Lindesmith et al. | Sept. 4, 1956 |
| 2,767,907 | Schwend | Oct. 23, 1956 |
| 2,772,048 | Collison et al. | Nov. 27, 1956 |
| 2,812,902 | Runde et al. | Nov. 12, 1957 |